Figure 1:
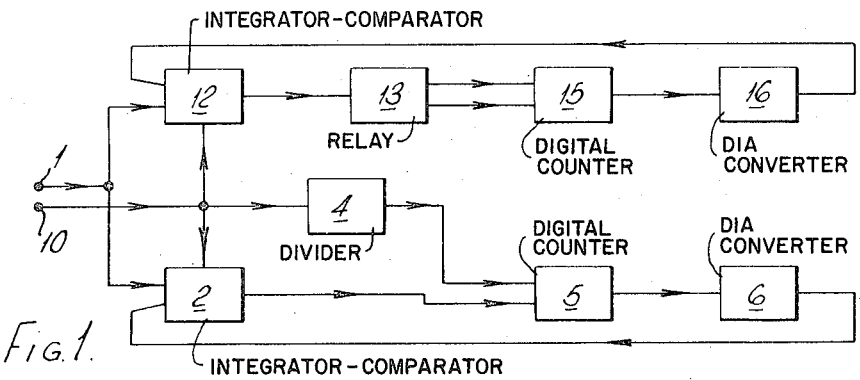

United States Patent [19]
Turner

[11] 3,816,721
[45] June 11, 1974

[54] CALCULATING APPARATUS

[75] Inventor: Peter Raymond Turner, London, England

[73] Assignee: Molins Limited, London, England

[22] Filed: Nov. 14, 1972

[21] Appl. No.: 306,460

[30] Foreign Application Priority Data
Nov. 17, 1971 Great Britain.................... 53337/71

[52] U.S. Cl.... 235/151.13, 235/151.35, 235/92 QC, 235/151.3, 235/193
[58] Field of Search.......... 235/151.35, 151.13, 193, 235/92 QC, 151.33, 151.3; 131/21 R, 21 A, 21 B, 21 CD

[56] References Cited
UNITED STATES PATENTS

| | | | |
|---|---|---|---|
| 3,146,344 | 8/1964 | Palmer........................... | 235/151.13 |
| 3,260,838 | 7/1966 | Anderson..................... | 235/151.13 X |
| 3,339,063 | 8/1967 | Norsworthy ................... | 235/151.13 |
| 3,471,685 | 10/1969 | Bishop........................... | 235/151.13 |
| 3,515,860 | 6/1970 | Fitzgerald, Jr.............. | 235/151.13 X |
| 3,566,092 | 2/1971 | Grant et al................. | 235/151.35 X |
| 3,612,839 | 10/1971 | DeWitt et al. ................. | 235/151.35 |
| 3,648,035 | 3/1972 | Hart et al...................... | 235/151.13 |

Primary Examiner—Malcolm A. Morrison
Assistant Examiner—Edward J. Wise
Attorney, Agent, or Firm—Craig & Antonelli

[57] ABSTRACT

This invention mainly concerns apparatus for calculating the standard deviation of the mass of a succession of cigarettes being produced on a continuous-rod cigarette making machine. The device receives, from a Beta-ray scanning device, a continuously varying voltage indicative of the tobacco mass of a given portion of the continuous rod, and a series of pulses synchronised with the cut-off so that a pulse appears whenever a portion of the continuous rod which will later be cut is subjected to the Beta-radiation beam. The continuously varying voltage is integrated over the period between the pulses to give a measure of the total mass of tobacco in the portion of the rod which will become an individual cigarette.

6 Claims, 3 Drawing Figures

PATENTED JUN 11 1974    3,816,721

CALCULATING APPARATUS

This invention relates to apparatus for calculating standard deviation of a significant parameter of articles. The apparatus is especially useful when employed in association with a machine which is continuously producing the articles in question, e.g., a continuous-rod cigarette-making machine.

Standard deviation is a recognized statistical measure of the consistency of any measurable property of an article, and may validly be employed for various purposes as long as any non-random sources of variation in the property are eliminated so that the distribution of specific values of the property under consideration among the "population" of articles concerned is a random (Gaussian) distribution. The standard deviation is calculated in any particular case by taking the square root of the average of the squares of the errors for all the articles (error being the difference between the actual value of the property being considered for each article and the mean value of that property for all the articles). The fraction of the total number of articles for which the error in the measured property exceeds a defined value has a fixed relationship to the defined value of the error, e.g., if the defined value of error equals twice the standard deviation, then 4.56 percent of the total number of articles will have errors exceeding the defined value, and this 4.56 percent of the articles will include equal numbers of articles in which the error is positive and of articles in which the error is negative.

It is an object of the present invention to provide apparatus for producing a continuous indication of the standard deviation of a property of articles for which property the articles are inspected in substantially continuous succession.

According to the invention there is provided apparatus for producing an electrical indication of standard deviation of a property of articles while a succession of such articles are being fed past a measuring device adapted to indicate in the form of an electric signal the value of said property for each article, comprising comparing means for receiving said electrical signal from the measuring device and emitting an electric resultant pulse whenever said electrical signal represents a value of said property beyond a limit represented as a reference voltage fed to said comparing means, count means arranged to produce a succession of count pulses in synchronism with articles being fed past the measuring device, each of said count pulses representing a preselected number (greater than 1) of articles, a digital counter connected to receive both the resultant pulses and the count pulses at two separate inputs, the counter being such that each pulse received at one of said inputs causes an increase by one of the number registered by said counter while each pulse received at the other of said inputs causes a reduction by one of said number, and a digital-to-analogue converter connected to said counter so as to produce an analogue voltage output which at all times represents the number registered in said counter, said converter being connected to deliver said output to the comparing means so as to control the reference voltage thereof.

The count means preferably includes a divider means arranged to receive a succession of pulses each representing one article passing the measuring device and to emit a single count pulse for each consecutive group of received pulses containing the preselected number of received pulses.

The preselected number on which the divider means operates must be correctly related to the reference level of the comparing means; for example, it is known that with a normal (Gaussian) distribution of the relevant property for a plurality of the articles, if the preselected limit represented by the reference level is set at a value of the property lower than the mean value for all the articles by 1.53 × the standard deviation, then in one-sixteenth of the total number of articles the value of that property will be below that limit. Accordingly, whenever the comparing means emits a resultant pulse for (on average) one in every 16 of the articles passing the measuring device, if the divider means is so set that one count pulse is delivered at its output for every sixteen of the pulses representing individual articles, the digital counter will over any given period receive equal numbers of resultant pulses and of count pulses and the number it registers will therefore not change. Hence the reference voltage of the comparing means will remain constant.

If however the standard deviation increases, then more of the articles will have a value of the relevant property which is beyond the limit, there will over a period be more resultant pulses than count pulses, and the number registered by the counter will increase until the resulting variation of the reference voltage by the digital-to-analogue converter output alters the limit to a point where the number of resultant pulses received by the counter over any period again balances the number of count pulses. There is thus a different value of the reference voltage of the comparing means for every value of standard deviation, so that said reference voltage in fact is indicative of the prevailing standard deviation.

Apparatus according to the invention as defined above is capable of indicating standard deviation whether or not the mean value of the relevant property of the articles is constant. However, where said mean value is variable the apparatus must be provided with correcting means to allow for changes in said mean value.

Said correcting means necessarily is required to determine the magnitude of any change in the mean value of the relevant property and for this purpose includes a further comparing means also arranged to receive the electrical signals from the measuring device and a second reference voltage representing a preselected value of said property, said further comparing means having two outputs and being adapted to emit a pulse signal at one or the other of said two outputs whenever one of said electrical signals indicates a value of the property above or below the preselected value respectively, a further digital counter having two inputs each connected to a different one of the outputs of the further comparing means and so arranged that each pulse signal received by said further counter causes the number registered by said further counter to increase or decrease by one according to which input of the counter receives the pulse signal, and a further digital-to-analogue converter connected to said further digital counter so as to produce an analogue voltage output which at all times represents the number registered in said counter, said further converter being connected to deliver said output to the further comparing means to control the second reference voltage.

While the invention is believed to be of general application, it is known to be especially useful in monitoring the output of a continuous-rod cigarette-making machine. In this context, the property to be measured is the weight (or more correctly, mass) of tobacco in each cigarette produced, but for convenience it is preferred to adopt the established practice of sensing the tobacco content of the cigarette rod prior to cutting it into individual cigarettes. This is conveniently done by passing a beam of Beta-radiation across the path of the rod to an ionisation chamber forming part of a detector which produces a continuous electric output varying according to the attenuation suffered by the radiation as it traverses the cigarette rod; this attenuation has been found to correspond at any instant to the mass of tobacco in the portion of the rod then within the beam. One form of measuring device of this nature is disclosed in our application U.S. Ser. No. 143,357. The continuous output signal from such a device may be integrated over periods of time corresponding to the lengths of rod which will become individual cigarettes.

It is preferred in the apparatus of the present invention, when used in association with a continuous-rod cigarette-making machine fitted with a Beta-ray measuring device, to employ as the conparing means a device capable of thus integrating the continuous signal from the measuring device. Such a device is disclosed in our application of even date herewith, entitled "Improvements in devices for mean value indication" U.S. Serial No. 306,425.

Figure 2:
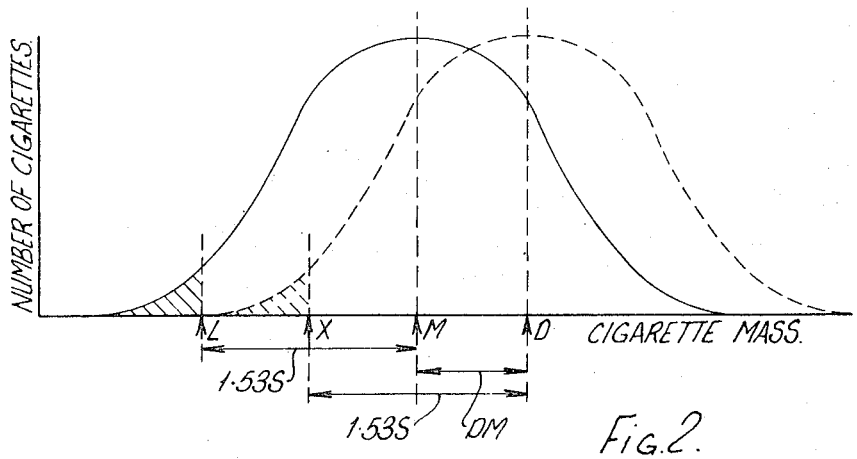
Figure 3:
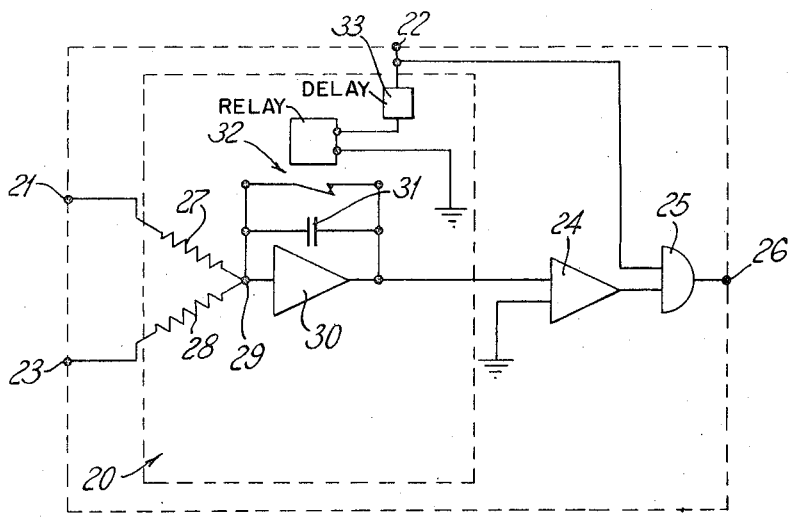

In order that the invention may be well understood, a preferred embodiment thereof will now be described, with reference to the accompanying drawings, in which:

FIG. 1 is a schematic block diagram of a preferred form of apparatus embodying the present invention, FIG. 2 is a distribution curve, annotated to assist in explanation of the operation of the apparatus of FIG. 1; and FIG. 3 is a further block diagram of a device used in the apparatus of FIG. 1 (being a device embodying the invention disclosed in our aforesaid application of even date herewith).

First referring to FIG. 1, the apparatus shown diagrammatically has a signal input terminal 1 connected to one input of a main integrator-comparator unit 2 and to one input of a secondary integrator-comparator unit 12. A synchronizing input terminal 10 is connected to a second input of each of the units 2, 12 and to a divider unit 4. The unit 2 has an output connected to one input of a digital counter 5, and the divider unit 4 has an output connected to a second input of said counter 5. A digital-to-analogue converter 6 is connected to receive a digital output from the counter 5 and deliver a corresponding analogue voltage to a third input of a comparator-integrator unit 2.

The secondary comparator-integrator unit 12 has an output connected to a relay unit 13 which in turn has two outputs connected to two imputs of a digital counter 15, and a further digital-to-analogue converter 16 is connected to receive a digital output from the counter 15 and deliver a corresponding analogue voltage to a third input of the unit 12.

The apparatus of FIG. 1 is intended for use in association with a continuous-rod cigarette-making machine fitted with a Beta-ray device for measuring continuously the mass of tobacco in the rod before the latter is cut into individual cigarettes. In operation, the input terminal 1 will receive a continuously-varying voltage indicative of the tobacco mass, and the input terminal 10 will receive a series of pulses so synchronised with the operation of the cigarette-making machine that a pulse appears at the terminal 10 whenever a portion of the cigarette rod which will later be cut is being subjected to the radiation beam of the Beta-ray device. The pulses at terminal 10 are accordingly termed "end-of-cigarette pulses" and it will be understood that the portion of the continuously-varying voltage appearing at terminal 1 in the time period between any two consecutive pulses at terminal 10 represents the mass variations along the length of one individual cigarette and the integral of the voltage at terminal 1 during that period indicates the total mass of tobacco in that one cigarette.

The comparator-integrator units 2, 12 are mutually similar and a preferred form of such unit will be described later with reference to FIG. 3. At the moment it is sufficient to say that each of the units 2, 12 receives the voltage from terminal 1, the end-of-cigarette pulses from terminal 10, and at its third input a reference voltage representing directly a particular value of mass per unit length of the cigarette rod and hence indirectly a particular total mass per cigarette; from these three inputs, the comparator-integrator unit delivers a resultant pulse at its output, synchronised with an end-of-cigarette pulse, whenever the integral of the signal at terminal 1 during the period since the preceding end-of-cigarette pulse represents a total cigarette mass beyond a selected value represented by the reference voltage. It is preferred to operate the apparatus on such a basis that a resultant pulse thus appears whenever the mass represented by the integral is less than a selected value, i.e., the cigarettes produced are lighter than the selected value.

Over a relatively long time, therefore, the counter 5 receives as many pulses as there are cigarettes lighter than the selected value and (if no other input were fed to the counter 5 and at the outset the latter had registered zero) at the end of that time the counter 5 would register the number of resultant pulses received. However, although the counter 5 duly receives the resultant pulses at one of its inputs and the count it registers increases by one when each resultant pulse is received, said counter 5 also receives pulses from the divider 4, which is fed with end-of-cigarette pulses from the terminal 10 and delivers one pulse to the other input of the counter 5 for every sixteen end-of-cigarette pulses. The pulses thus received at said other input each cause the counter 5 to reduce the count it registers by one.

If therefore, during any time period considered, the resultant pulses delivered by unit 2 to the one input of the counter 5 are equal to one-sixteenth of the number of end-of-cigarette pulses delivered to the other input, at the end of that time period the state of the counter will be the same as at the beginning. The digital output supplied by the counter 5 to the converter 6, and the analogue voltage delivered by the converter 6 to the third input of the unit 2 as the reference voltage for that unit, will both be the same as they were at the start of the time period.

However, if during any time period the resultant pulses total more than one-sixteenth of the end-ofcigarette pulses occurring in the same period, the number registered in the counter will be greater at the end of the period, the increase being equal to the number of resultant pulses minus one-sixteenth the number of end-of-cigarette pulses. The digital output fed to the digital-to-analogue converter 6 will be correspondingly greater, and hence a greater voltage will be fed to the third input of unit 2 as a reference voltage. The unit 2 will therefore, with this increase of reference voltage, produce less resultant pulses for any given number of end-of-cigarette pulses (assuming a normal distribution of cigarette mass among the individual cigarettes) as the increased reference voltage represents a lower selected value of cigarette mass and each resultant pulse corresponds to a cigarette lighter than the selected value.

It will be understood that there is no sudden change — as soon as the number registered in counter 5 begins to increase, so does the reference voltage for unit 2. The elements 2, 5, 6 form a closed-loop system which is stable, i.e., in which the number registered in counter 5 does not change and hence the reference voltage at the third input of unit 2 is constant, whenever on average one cigarette in every 16 is found to be lighter than the mass represented by said reference voltage.

With a normal (Gaussian) distribution of masses of individual cigarettes, one cigarette in every sixteen is lighter than 1.53 times the standard deviation below the mean mass of all cigarettes. When the closed-loop system of elements 2, 5, 6 is stable, therefore, provided that there is no variation of the mean mass of all cigarettes, the reference voltage fed by the converter 5 to the third input of unit 2 must represent the prevailing standard deviation (as the coefficient 1.53 is a statistical constant).

However, in practice allowance is normally required to be made for variation of the mean mass of all cigarettes and this is effected by a further closed-loop system comprising elements 12, 13, 15 and 16. The unit 12 is similar to unit 2, and the elements 15, 16 are respectively a digital counter (similar to counter 5) and a digital-to-analogue converter (similar to converter 6). The element 13 is a relay unit which functions to supply a pulse to one input of the counter 15 whenever a resultant pulse is received from the unit 12, and to supply a pulse to the other input of the counter 15 whenever no resultant pulse is received from the unit 12 at the time of an end-of-cigarette pulse.

Said further closed-loop system operates in similar manner to the system comprising the elements 2, 5 and 6; in this instance, however, the counter 15 receives a pulse at one or other of its inputs at the time of each end-of-cigarette pulse, as if no resultant pulse is delivered to the one input of said counter by the unit 12, the relay unit 13 supplies a pulse to its other input. The reference voltage applied to the third input of the unit 12 represents (whenever the mean mass of all the cigarettes is correct) the desired mass of one cigarette and the unit 12 is arranged to deliver a resultant pulse whenever the integral produced in said unit 12 during the period between two consecutive end-of-cigarette pulses indicates that the mass of an individual cigarette is less than the desired value.

So long as the mean mass of all cigarettes produced over a period equals the desired value, the number of cigarettes having individual masses below the desired value will be equal to the number of cigarettes having individual masses above than said desired value. Thus there will be equal numbers of pulses applied to the two inputs of the counter 15, so that the number registered therein does not change, hence the reference voltage applied to the third input of the unit 12 does not change.

If however the mean mass of the cigarettes changes, the number of cigarettes of mass below the desired value no longer equals the number of mass above that value; for example, if the mean mass falls, then the number of cigarettes with a mass below the desired value represented by the reference voltage at the third input of unit 12 will be greater than the number with a mass above that value. Hence more than half the total number of cigarettes give rise to resultant pulses from unit 12 and hence more pulses are received at the one input of the counter 15 than at the other and the number registered in the counter increases correspondingly; the digital output from the counter 15 to the digital-to-analogue converter 16 also rises and hence the analogue output of said converter 16 increases, i.e., the reference voltage at the third input of unit 12 increases (representing a lower value of cigarette mass). These changes continue until the reference voltage represents a value of cigarette mass equal to the actual mean mass of cigarettes as indicated by the measuring device. The system is then balanced again, i.e., the number of pulses being received in any period at the one input of the counter 15 is equal to the number received at the other, so that the number registered in the counter 15 and the value of the reference voltage are stable at new values corresponding to the actual mean mass.

With both closed-loop systems stable, the reference voltage at the third input of the unit 2 represents the standard deviation plus the difference between actual mean mass and desired mean mass, and the reference voltage at the third input of the unit 12 represents the difference between actual mean mass and desired mean mass. Hence the standard deviation alone is represented by the difference between said reference voltages, which can readily be indicated by connecting any convenient form of sensing device between the said third inputs; naturally, the sensing device employed must not be such as to provide a low-impedance path between said third inputs as this would disturb the operation of both closed-loop systems.

To assist in understanding the operation of the apparatus described above, in FIG. 2 there is shown a normal distribution curve for, for example, the masses of individual cigarettes produced by a cigarette making machine. The curve is drawn twice, once in full line and once in dashed line. The horizontal (X) coordinate of any point on the curve represents cigarette mass, while the vertical (Y) coordinate of such point represents the number of cigarettes having the particular mass represented by the horizontal coordinate.

The full-line curve is symmetrical about the curve's maximum at which the cigarette mass is indicated as M and is the actual mean mass of all cigarettes in the "population" (those measured to provide the plotted data). The dashed-line curve is displaced to the right, its maximum being at a mass D, the desired (mean) value of cigarette mass. In the left-hand portion of the curve, a limit value of cigarette mass is indicated at L, this being the value represented by the reference voltage fed to the third input of the unit 2, and the cross-hatched area under the curve to the left of the value L represents the number of cigarettes of lower mass than the value L, i.e., the number of cigarettes giving rise to resultant pulses from the unit 2. When the closed-loop system of elements 2, 5, 6 is stable, this shaded area represents one-sixteenth of the total area under the curve, and this relationship is true whatever the mean value, provided that the value L is lower than the actual mean mass by 1.53 times the prevailing standard deviation (S). Thus when the mean mass of the cigarettes is at the desired value D, so that the dashed-line curve illustrates the distribution of individual cigarettes according to their measured mass, the limit corresponding to the reference voltage is at a value X, equal to D — 1.53S, and the shaded area again represents one-sixteenth of the population.

FIG. 3 illustrates schematically the preferred arrangement of each of the units 2, 12. As shown in FIG. 3, each such unit comprises a summing integrator generally indicated at 20, first, second and third input terminals 21, 22, 23 respectively, a level discriminator 24, an AND gate 25 and an output terminal 26. The summing integrator comprises two input resistors 27, 28 of equal value connected between the input terminals 21, 23 respectively and a common point 29, an inverting amplifier 30 having its input connected to the point 29 and its output connected to the discriminator 24, a capacitor 31 connected between the input and output of the amplifier 30, and a normally-open reset switch 32 connected so that, when closed, it discharges the capacitor 31. The output of the discriminator 24 is connected to an input of the gate 25. The second input terminal 22 is connected directly to a second input of the gate 25, and indirectly, through a delay circuit 33, to the reset switch 32; said switch is for illustrative purposes represented as an electromechanical relay, but in practice, to obtain a suitably quick response, an electronic device is employed as the reset switch, preferably a field-effect transistor.

In operation, the first input terminal 21 receives the continuously-varying signal from the Beta-ray measuring device and terminal 23 receives the reference voltage. It will be assumed that the signal at terminal 21 goes more positive as the tobacco mass per unit length falls. At point 29, therefore, at any instant there is an input signal proportional to the algebraic sum of the voltages at input terminals 21 and 23 and the amplifier 30 and capacitor 31 coact in known manner to cause the capacitor to charge under control of said input so that at any instant the charge on capacitor 31 represents the integral of said input signal at terminal 29 over a period prior to that instant. As the signal at terminal 21 represents the mass of tobacco in the portion of cigarette rod in the beam of the measuring device at the relevant instant, and the reference voltage at terminal 23 represents in magnitude a particular value of that mass (being proportional to the value L of FIG. 2) but is of opposite polarity to the voltage at terminal 21, the integral represented by the voltage across capacitor 31 represents the total error in the tobacco mass, relative to the value represented by the reference voltage, over the period of integration.

The capacitor 31 is discharged by operation of the reset switch 32 a very short time after the occurrence of an end-of-cigarette pulse at terminal 22, hence at the time of the next end-of-cigarette pulse the voltage across capacitor 31 represents the total mass error in a portion of rod which will after cutting of the rod become an individual cigarette. Said voltage across the capacitor 31 is applied to a first input of the level discriminator 24 which has a second input connected to earth, and said discriminator is so arranged that a voltage appears at its output whenever the voltage at its first input is negative relative to the voltage at its second input. Thus whenever, as an end-of-cigarette pulse commences, the voltage across capacitor 31 indicates that the total mass error in the portion of rod which has passed the measuring device since the last end of cigarette pulse is negative (i.e., the mean mass per unit length of said portion is less than that represented by the reference voltage) there is a voltage at the output of the discriminator 24 and hence also at one input of the AND gate 25; as the end-of-cigarette pulse appearing at terminal 22 is applied to the other input of the gate 25, the latter delivers an output at the terminal 26 for as long as the end-of-cigarette pulse lasts; as the end-of-cigarette pulse terminates at terminal 22, switch 32 is operated by the delayed end-of-cigarette pulse emerging from delay circuit 33.

It may be mentioned that the major components of the apparatus described above may be commercially available units as follows:

| | |
|---|---|
| Amplifier 30 | JEDEC No. SN 72741N |
| Counters 5, 15 | JEDEC No. SN 74193N |
| Digital to analogue Converter | "Precision Monolithic" AIM/DAC LOODD |

The remaining components may be of any conventional form which is compatible with the components specified above and perform the required functions in accordance with the foregoing description.

Various changes or modifications may be made in the apparatus described without departure from the scope of the invention. Thus for example while the divider unit 4 as described above is arranged to deliver one pulse to the counter 5 for every 16 end-of-cigarette pulses, said unit 4 may be such as to provide a different ratio between the numbers of pulses it delivers and those it receives. In this event the constant of proportionality between the reference voltage at the third input of unit 2 and the standard deviation will also be different but the general mode of operation of the apparatus will be unchanged.

I claim:

1. Apparatus for producing an electrical indication of standard deviation of a property of articles while a succession of such articles are being fed past a measuring device adapted to indicate in the form of an electric signal the value of said property for each article, comprising comparing means for receiving said electrical signal from the measuring device and emitting an electric resultant pulse whenever said electrical signal represents a value of said property beyond a limit represented as a reference voltage fed to said comparing means, a digital counter having two inputs, one input being connected to receive said resultant pulses, the other input being connected to receive a succession of count pulses in synchronism with articles being fed past the measuring device, each of said count pulses representing a preselected number (greater than 1) of articles, the counter being such that each pulse received at one of said inputs causes an increase by one of the number registered by said counter while each pulse received at the other of said inputs causes a reduction by one of said number, and a digital-to-analogue converter connected to said counter so as to produce an analogue voltage output which at all times represents the number registered in said counter, said converter being connected to deliver said output to the comparing means as said reference voltage.

2. Apparatus as claimed in claim 1, further including divider means connected to said other input of said digital counter for receiving a succession of pulses each representing one article passing the measuring device and emitting a single count pulse for each consecutive group of received pulses containing the preselected number of received pulses.

3. Apparatus as claimed in claim 2 including correcting means to allow for changes in mean value of said property of the articles.

4. Apparatus as claimed in claim 3, in which said correcting means includes a further comparing means also arranged to receive the electrical signals from the measuring device and a second reference voltage representing a preselected value of said property, said further comparing means having two outputs and being adapted to emit a pulse signal at one or the other of said two outputs whenever one of said electrical signals indicates a value of the property above or below the preselected value respectively, a further digital counter having two inputs each connected to a different one of the outputs of the further comparing means and so arranged that each pulse signal received by said further counter causes the number registered by said further counter to increase or decrease by one according to which input of the counter receives the pulse signal, and a further digital-to-analogue converter connected to said further digital counter so as to produce an analogue voltage output which at all times represents the number registered in said counter, said further converter being connected to deliver said output to the further comparing means to control the second reference voltage.

5. Apparatus as claimed in claim 1 for monitoring the output of a continuous-rod cigarette-making machine, in which the measuring device is arranged to sense the tobacco content of the cigarette rod produced by said machine.

6. Apparatus as claimed in claim 5, in which the measuring device comprising means to direct a beam of Beta-radiation across the path of the cigarette rod, a detector including an ionisation chamber arranged to receive the beam and arranged to produce a continuous electric output signal varying according to the attenuation suffered by the beam as it traverses said rod, and means for integrating said signal over periods of time corresponding to the lengths of rod which will become individual cigarettes.

* * * * *